United States Patent [19]

Asakura

[11] Patent Number: 5,450,512
[45] Date of Patent: Sep. 12, 1995

[54] OPTICAL TAP

[75] Inventor: Hiroyuki Asakura, Osaka, Japan

[73] Assignee: Matsushita Electric Industrial Co., Ltd., Kadoma, Japan

[21] Appl. No.: 223,029

[22] Filed: Apr. 5, 1994

[30] Foreign Application Priority Data

Apr. 12, 1993 [JP] Japan .................. 5-084615

[51] Int. Cl.⁶ .................. G02B 6/00; G02B 6/36
[52] U.S. Cl. .................. 385/48
[58] Field of Search .................. 385/27, 31, 36, 37, 385/39, 42–44, 48; 359/109, 130, 618, 634, 843, 857, 859, 860

[56] References Cited

U.S. PATENT DOCUMENTS

| | | | |
|---|---|---|---|
| 3,905,676 | 9/1975 | Ulrich | 385/36 |
| 3,975,081 | 8/1976 | Kato et al. | 359/15 |
| 4,125,860 | 11/1978 | Ishii et al. | 369/109 |
| 5,040,165 | 8/1991 | Toshiaki | 369/275.4 |

*Primary Examiner*—Akm E. Ullah
*Attorney, Agent, or Firm*—Beveridge, DeGrandi, Weilacher & Young

[57] ABSTRACT

An optical tap for selecting a signal of only a certain wavelength from transmitted signals which are wavelength division-multiplexed. The tap transmits signals of other wavelengths as they are. The tap has an input optical fiber for receiving the wavelength division-multiplexed signals, a first diffraction grating for dispersing the incident light through a different angle for each different wavelength, a reflecting mirror for reflecting the certain wavelength of the dispersed light signal to select this wavelength, a first output fiber for delivering only the selected light, a second diffraction grating which concentrates the unreflected light, and a second output fiber for delivering the unselected wavelengths.

18 Claims, 14 Drawing Sheets

OPTICAL TAP

BACKGROUND OF THE INVENTION

1. Field of the Invention

The present invention relates to an optical tap used to select signals transmitted by wavelength division multiplexing in light transmissions and in light LAN (local area network) communications.

2. Related Art of the Invention

In recent years, as computer technology has evolved, LANs (local area networks) have spread as data communications among terminals. Today, time sharing is used to transmit and exchange data among terminals. As networks have been improved in performance and made more versatile, it has been necessary to treat images, voices, and other information as well as data. To transmit these kinds of information, the transmission capacity must exceed 100 M bps. However, limitations are imposed on the transmitting function of the current time-sharing LANs. Therefore, there is a demand for LANs of higher speeds and higher throughputs.

In optical fiber communications, wavelength division multiplexing (WDM) is available to transmit multichannel signals over a single fiber. In the transmitter, signals of various channels are wavelength division-multiplexed with light signals of different wavelengths. The wavelength division-multiplexed signals are transmitted to a receiver via a single fiber. The receiver selects and demodulates a desired light signal by an optical separator or optical tuner. Instead of the use of such a optical separator or optical tuner, only a desired wavelength is selected, and other light signals are passed as they are. In this way, a LAN which has exchanging function, operates at a high speed, and excellent in economy can be built (Technical Research Report OQE-91-126, the Electronic Information Communications Society, p. 61, 1992).

An optical tap is used to select signals as described above. This optical tap is composed of two light-polarizing beam splitters and a wavelength-selecting light polarization converter utilizing an acousto-optic effect. Light signals of a channel to be selected are polarized by the wavelength-selecting light polarization converter. Only the desired light signal is passed through the beam splitters to take an output light.

However, the direction of polarization of light transmitted over ordinary fibers is not definite. In addition, the direction is varied by the external environment. Therefore, the plane of polarization of light incident on the optical tap jitters. As a result, the intensity of the output light fluctuates, and noise is induced. The above problems may be solved by using a plane of polarization-maintaining fiber as the transmission fiber. However, this is more expensive than ordinary fibers. Also, it is more difficult to connect the plane of polarization-maintaining fiber. Furthermore, the application of this fiber is limited, since currently widespread fiber paths are not formed by plane of polarization-maintaining fibers.

Additionally, the wavelength-selecting light polarization converter itself results in jitters because of its temperature dependence and power variations. There exist optical separators and optical tuners capable of selecting wavelengths, but they select only certain wavelengths. Signals of wavelengths not selected are discarded. That is, they are unable to make light signals branch off. Consequently, they cannot be used as optical taps.

SUMMARY OF THE INVENTION

In view of the foregoing problems with the prior art optical tap, it is an object of the present invention to provide a small-sized, inexpensive, low-loss, wavelength-selecting optical tap which is insusceptible to noise.

In the above structure according to the invention, the diffraction grating disperses light. The reflecting mirror located at a given position selects a certain wavelength of light. In this way, a small-sized, inexpensive optical tap which does not depend on dispersion of light and passes light signals lying in a desired wavelength range is realized.

DESCRIPTION OF THE PREFERRED EMBODIMENTS

Embodiments of the invention are hereinafter described with reference to the drawings.

Figure 1:
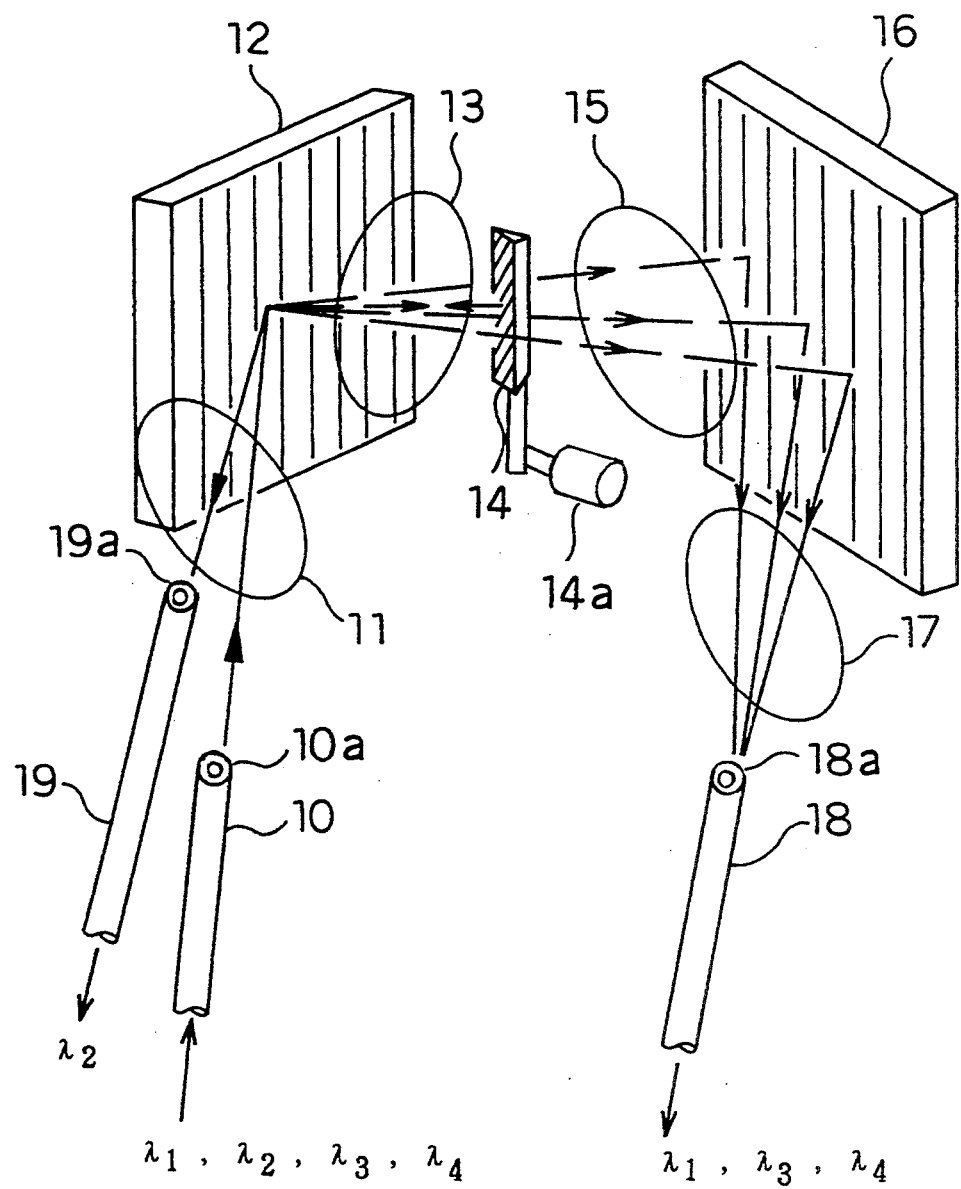
FIG. 1 is a perspective view of an optical tap according to the invention.

FIG. 1 shows the structure of an optical tap according to the invention. The tap comprises an input fiber 10, lenses 11, 13, 15, 17, plane diffraction gratings 12, 16, output fibers 18, 19, and a reflecting mirror 14. Signals which are wavelength division-multiplexed with wavelengths $\lambda_1$, $\lambda_2$, $\lambda_3$, and $\lambda_4$ are entered from the input fiber 10 and collimated by the lens 11. Then, the signals are made to enter the diffraction grating 12. The incident light rays are dispersed through a different angle for each different wavelength by the diffraction grating 12. The dispersed light is passed to the lens 13, so that the dispersed light is focused at the focal plane of the lens 13. The reflecting mirror 14 is disposed in the focal plane of the lens 13 and reflects only a certain wavelength of the dispersed light. The dispersed light reflected by the reflecting mirror 14 passes through the lens 11 and enters the output fiber 19.

Figure 2:
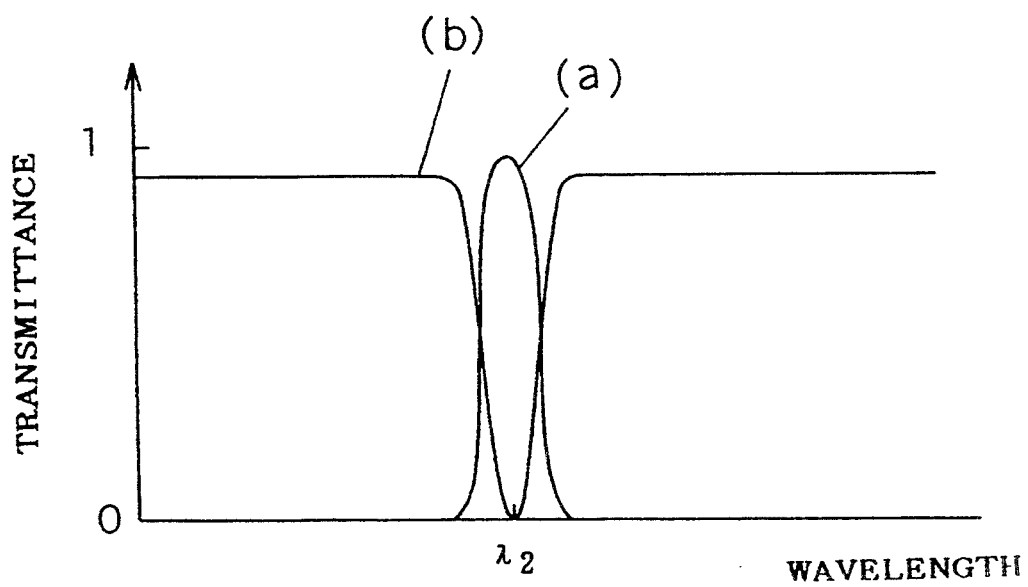
FIG. 2 is a diagram showing the wavelength pass band characteristics of the optical tap shown in FIG. 1.

If the reflecting mirror 14 is located in such a position as to reflect only the wavelength $\lambda_2$, the wavelength pass band for the light going from the input fiber 10 to the output fiber 19 exhibits a characteristic as shown by the curve labelled "a" in FIG. 2. The pass band width is determined by the groove spacing in the diffraction grating, the focal distance of the lens, and the width of the reflecting mirror taken in the direction of dispersion. The wavelength of the transmitted wavelength is determined by the slit position.

Figure 3:
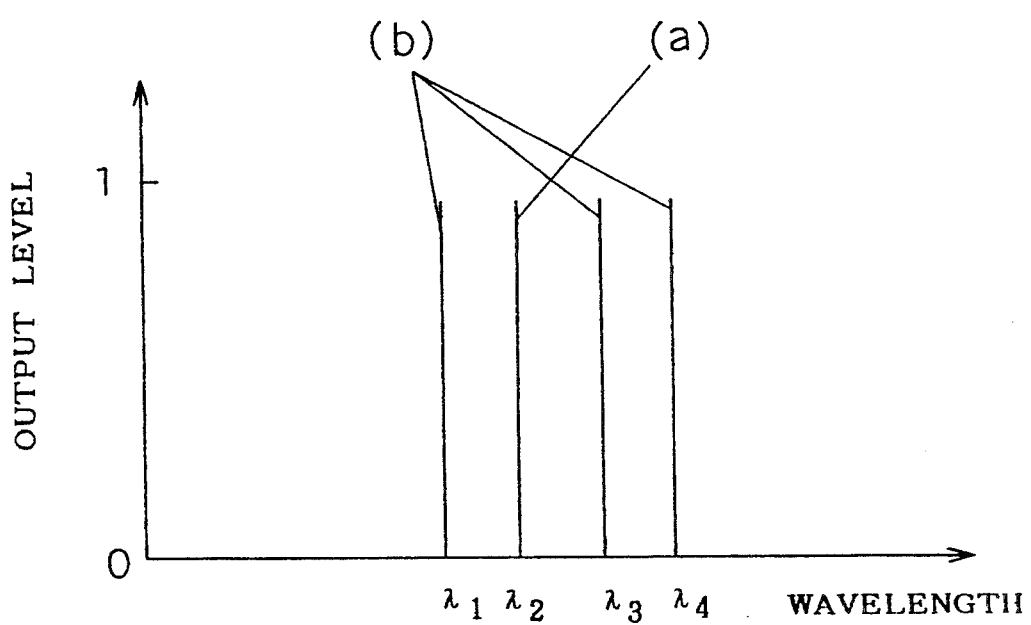
FIG. 3 is a diagram illustrating tuning of signals transmitted by wavelength division multiplexing, the tuning being done by the optical tap shown in FIG. 1.

The wavelengths $\lambda_1$, $\lambda_3$, and $\lambda_4$ of light which are not reflected by the reflecting mirror 14 are coupled into the output fiber 18 by the lens 17 and the diffraction grating 16. Accordingly, the output fiber 18 shows a wavelength pass band characteristic as shown by the curve labelled "b" in FIG. 2. Therefore, if light signals which are wavelength division-multiplexed with the wavelengths $\lambda_1$, $\lambda_2$, $\lambda_3$, and $\lambda_4$ are entered from the input fiber 10, then light signal of the wavelength $\lambda_2$, as shown by the line labelled "a" in FIG. 3, is taken from the output fiber 19. The light signals of wavelengths $\lambda_1$, $\lambda_3$, and $\lambda_4$, as shown by the lines labelled "b" in FIG. 3, are taken from the output fiber 18.

Light of a desired wavelength can be tapped from the output fiber 19 by moving the reflecting mirror 14 in the direction of dispersion through the use of a driving device 14a such as a stepper motor or a piezoelectric device.

The tolerance for optical adjustments can be increased by using core-enlarged fibers as the output fibers 18 and 19, the core-enlarged fibers being fabricated by increasing the diameter at the end surfaces of their cores by thermal diffusion or other method. Also, increase in loss due to mis-alignment of optical axes can be suppressed.

Furthermore, the end surfaces of the input fiber 10 and of the output fibers 18 and 19 can be obliquely polished or cut. This attenuates the amount of light reflected from the end surfaces of the fibers. Hence, noise due to interference of light rays can be reduced.

In addition, an anti-reflection coating can be formed on the end surfaces of the input fiber 10 and of the output fibers 18, 19. This decreases both reflection loss occurring at the end surfaces of the fibers and the amount of reflected light. As a result, noise attributed to interference of light rays can again be reduced.

Further, the coupling loss at the input fiber 10 and at the output fibers 18, 19 can be reduced to a minimum by using aberration-corrected aspherical lenses as the lenses 11, 13, 15, and 17. Moreover, the collimator lens can consist of a single lens and thus can be made simple in design. Consequently, the apparatus can be made smaller in size and less expensive.

Additionally, the coupling loss occurring at the input fiber 10 and at the output fibers 18, 19 can be reduced by using refractive index-distributed rod lenses as the lenses 11, 13, 15, and 17. Since the lens end surfaces are flat, it is easy to couple them into optical fibers and into a diffraction grating. Moreover, the collimator lens can consist of a single lens and thus can be made simple in design. Consequently, the apparatus can be made smaller in size and less expensive.

The lenses can be omitted by using curvilinear-corrgated diffraction gratings or concave diffraction gratings instead of the plane diffraction gratings 12 and 16.

Figure 4:
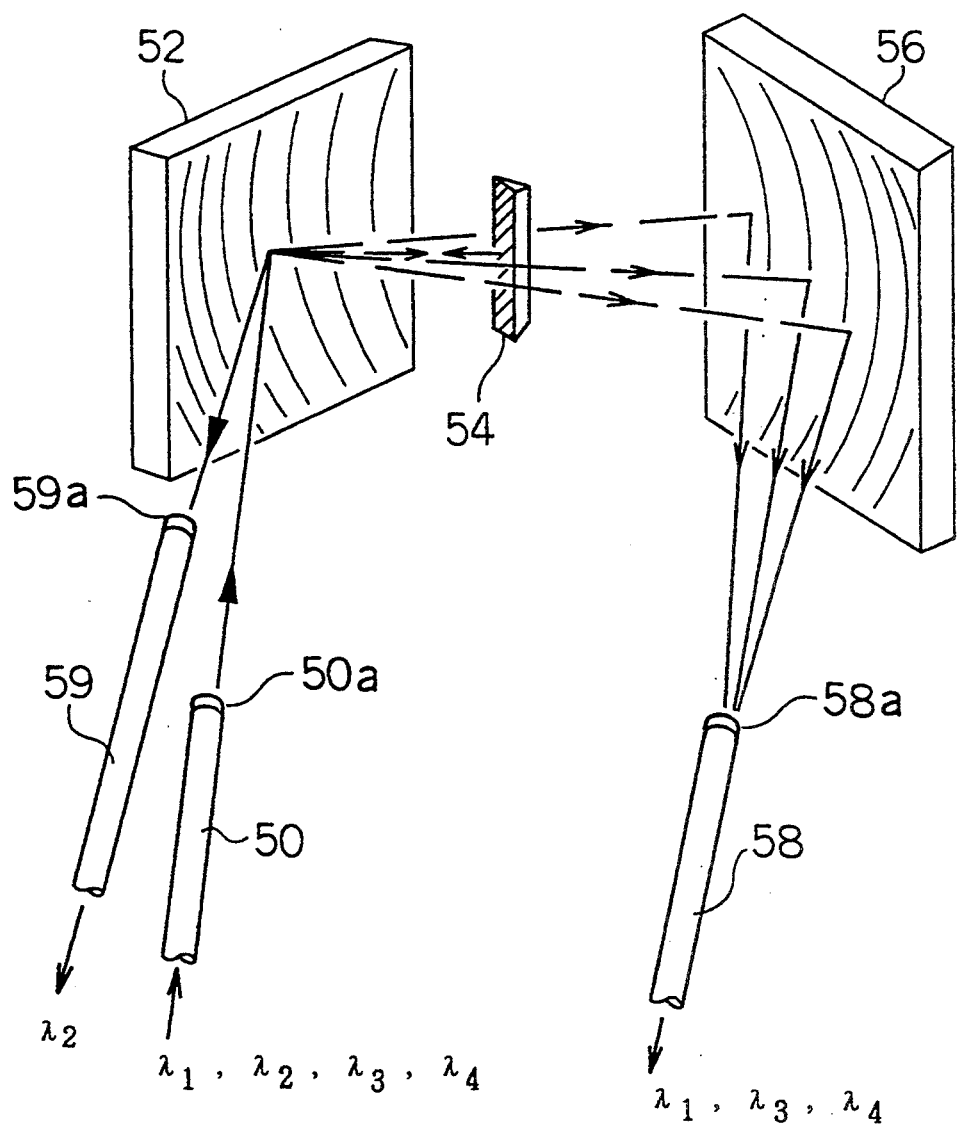
FIG. 4 is a perspective view of another optical tap according to the invention.
Figure 5:
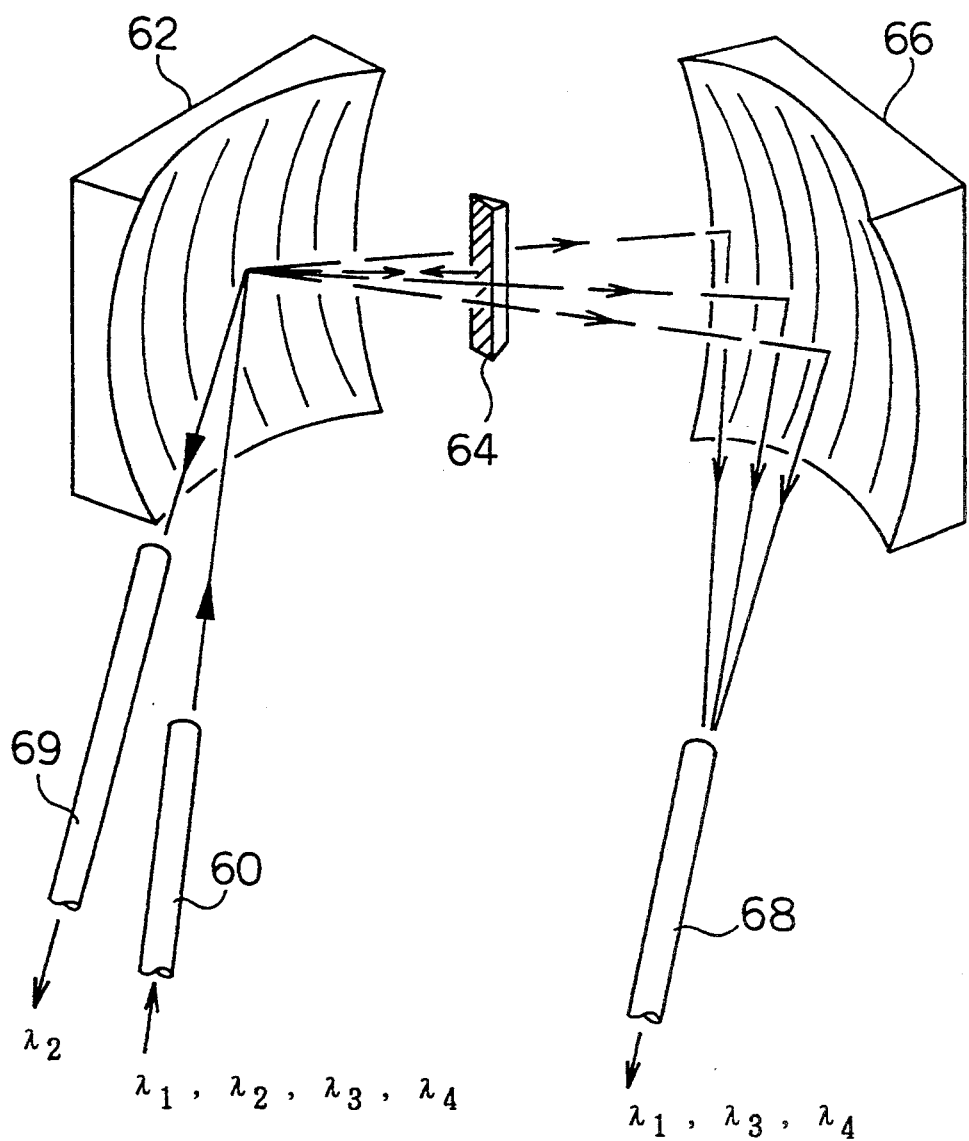
FIG. 5 is a perspective view of a further optical tap according to the invention.

FIG. 4 shows an example in which curvilinear-corrgated diffraction gratings 52 and 56 are used. FIG. 5 shows an example in which concave diffraction gratings 62 and 66 are employed. In these examples, no lenses are used and so the number of components is fewer than conventional. Also, the whole instrument can be made small in size. In these examples, if a leaf mirror is used as the reflecting mirror, greater tolerance is given to the angle at which the reflecting mirror is mounted.

Figure 6:
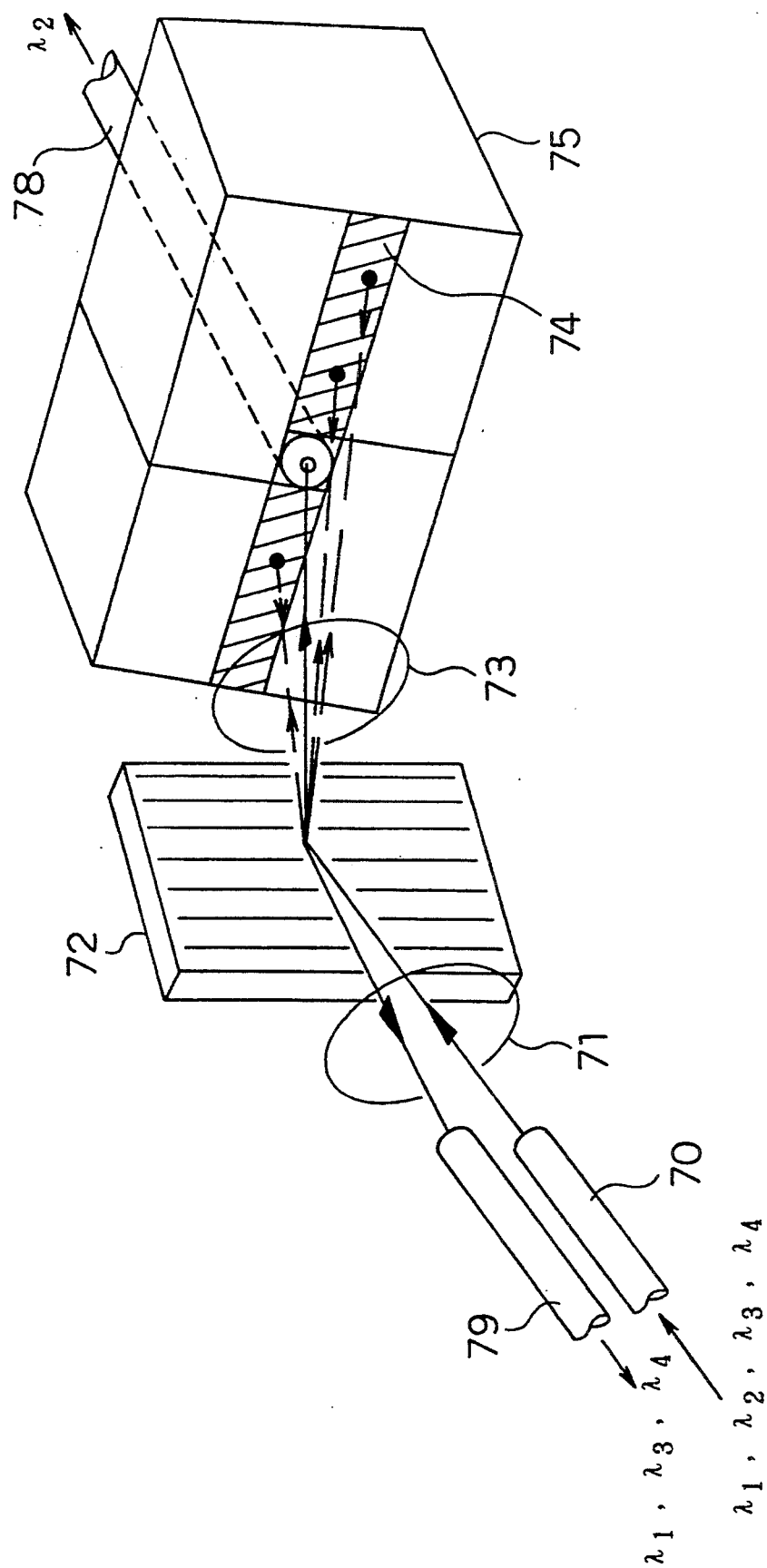
FIG. 6 is a perspective view of a yet other optical tap according to the invention.

FIG. 6 shows the structure of another optical tap according to the invention. This tap comprises an input fiber 70, lenses 71, 73, a plane diffraction grating 72, output fibers 78, 79, a reflecting mirror 74, and a holding block 75. Light signals which are wavelength division-multiplexed with wavelengths $\lambda_1$, $\lambda_2$, $\lambda_3$, and $\lambda_4$ are entered from the input fiber 70 and collimated by the lens 71. Then, the signals are made to impinge on the diffraction grating 72. The incident light rays are dispersed through a different angle for each different wavelength by the diffraction grating 72. The dispersed light is made to fall on the lens 73, so that the dispersed light is focused at the focal plane of the lens 73. The dispersed light focused at the end surface of the output fiber 78 enters this output fiber 78 and is taken from this fiber. The reflecting mirror 74 is disposed in the focal plane of the lens 73 and reflects the dispersed light. If the core of the output fiber 78 is so located that light of wavelength $\lambda_2$ is focused at this core, the wavelength pass band for the light going from the input fiber 70 to the output fiber 78 exhibits a characteristic as shown in FIG. 2(a). The pass band width is determined by the groove spacing in the diffraction grating 72, the focal distance of the lens, and the diameter of the core of the output fiber 78. The wavelength of the transmitted wavelength is determined by the position of the core of the output fiber 78.

The wavelengths $\lambda_1$, $\lambda_3$, and $\lambda_4$ of light which are reflected by the reflecting mirror 74 are coupled into the output fiber 79 by the lens 71 and the diffraction grating 72. Accordingly, the output fiber 79 shows a wavelength pass band characteristic as shown by the curve labelled "b" in FIG. 2. Therefore, if light signals which are wavelength division-multiplexed with the wavelengths $\lambda_1$, $\lambda_2$, $\lambda_3$, and $\lambda_4$ are entered from the input fiber 70, then light signal of the wavelength $\lambda_2$ is taken from the output fiber 78, as shown by the line labelled "a" in FIG. 3. The light signals of wavelengths $\lambda_1$, $\lambda_3$, and $\lambda_4$ are taken from the output fiber 79, as shown by the lines labelled "b" in FIG. 3. In the present example, the output fiber 78 and the reflecting mirror 74 are made integral by the holding block 75. In particular, the block 75 consists of two parts each having a step on the inside. The steps of the two parts are combined to form a central hole in which the output fiber 78 is inserted. The reflecting mirror 74 is cemented to central portions of the parts.

Figure 7:
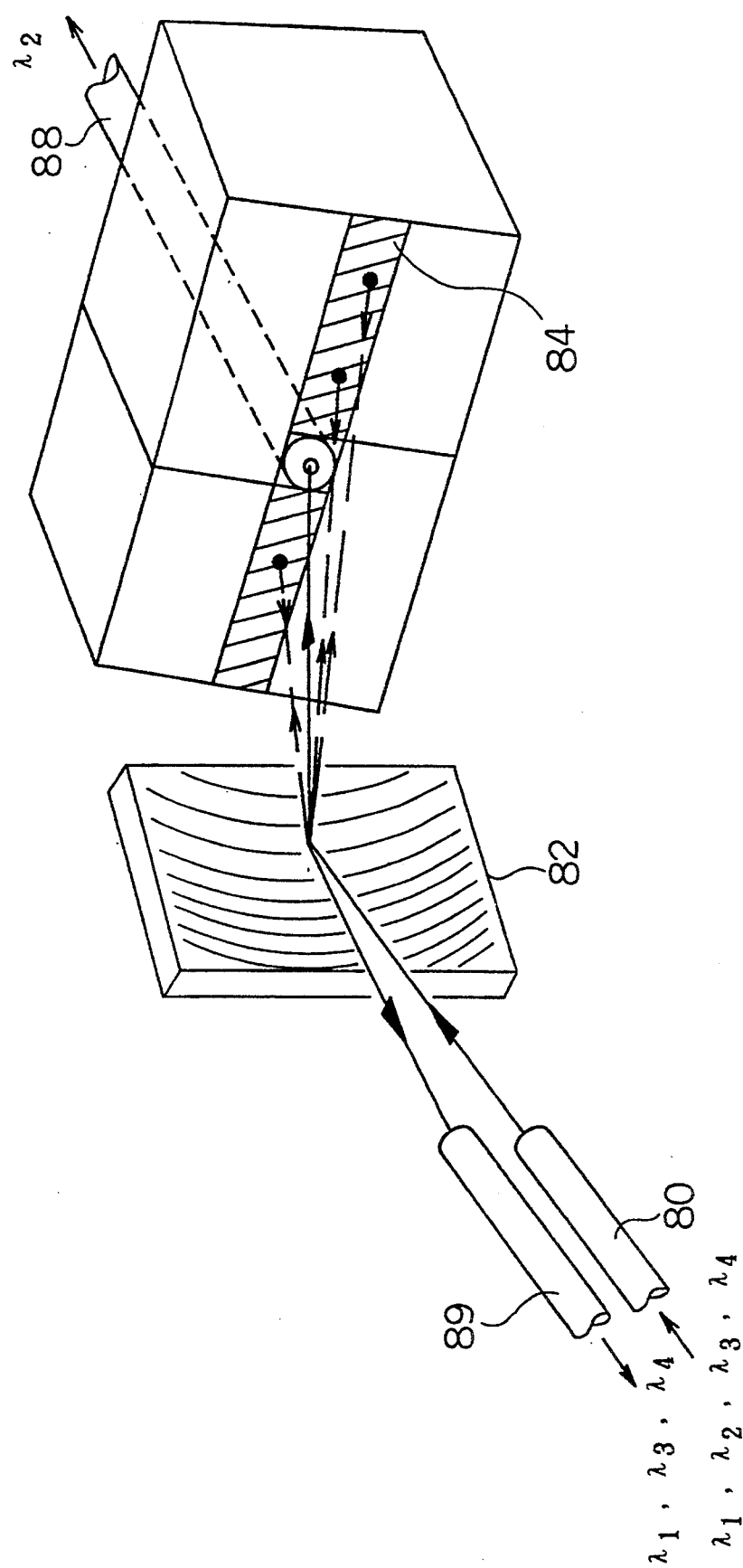
FIG. 7 is a perspective view of a still other optical tap according to the invention.
Figure 8:
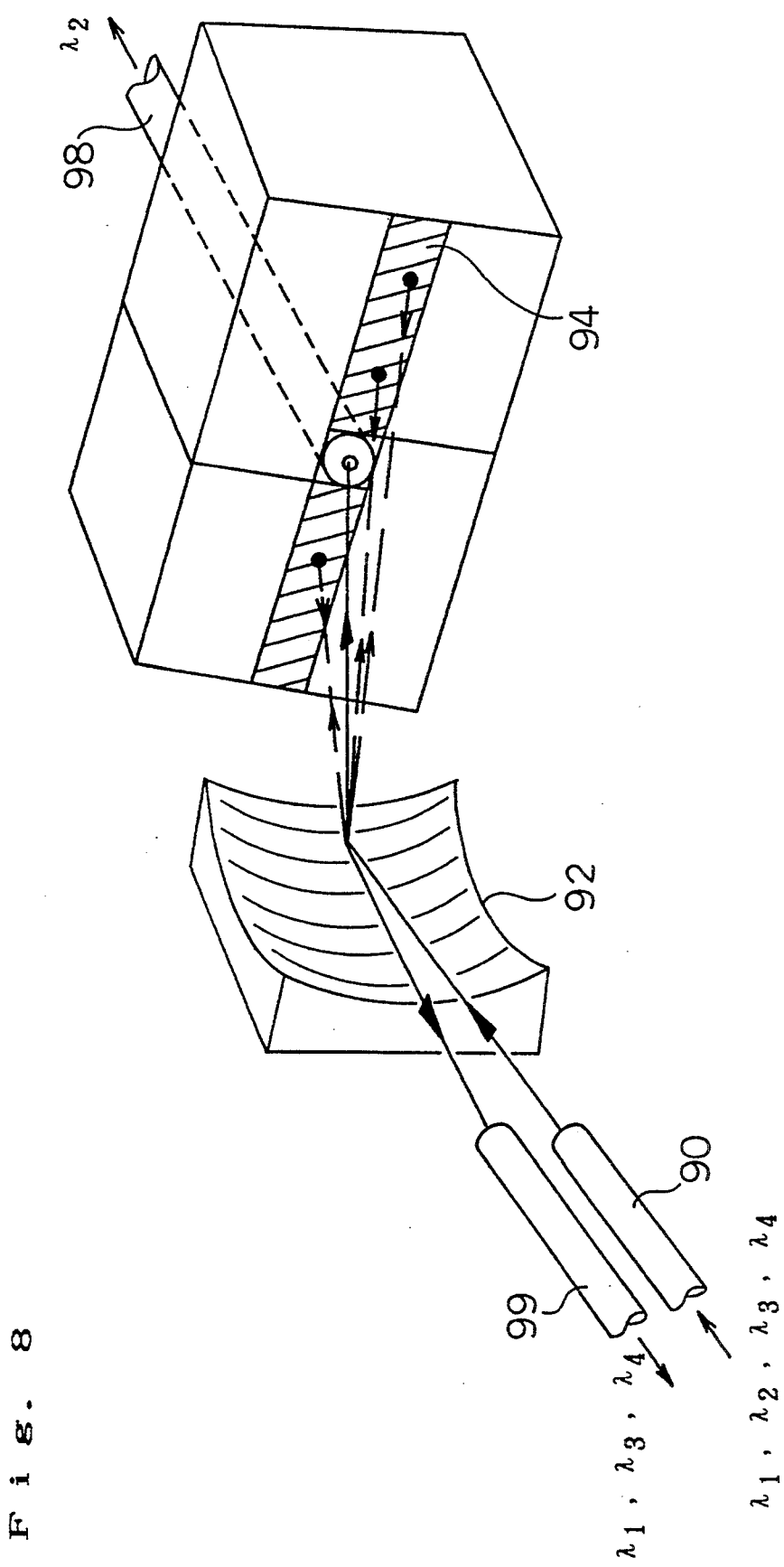
FIG. 8 is a perspective view of an additional optical tap according to the invention.

The lenses can be omitted by using curvilinear-corrgated diffraction gratings or concave diffraction gratings instead of the plane diffraction gratings 72. FIG. 7 shows an example in which a curvilinear-corrgated diffraction grating 82 is used. FIG. 8 shows an example in which a concave diffraction grating 92 is employed. In these examples, no lenses are used and so the number of components is fewer than conventional. Also, the whole instrument can be made small in size. Light of a desired wavelength can be tapped from the output fibers 78, 88, and 98 by rotating the diffraction gratings 72, 82, and 92 or moving them in the direction of dispersion by a stepper motor, a piezoelectric device, or other driving device.

Figure 9:
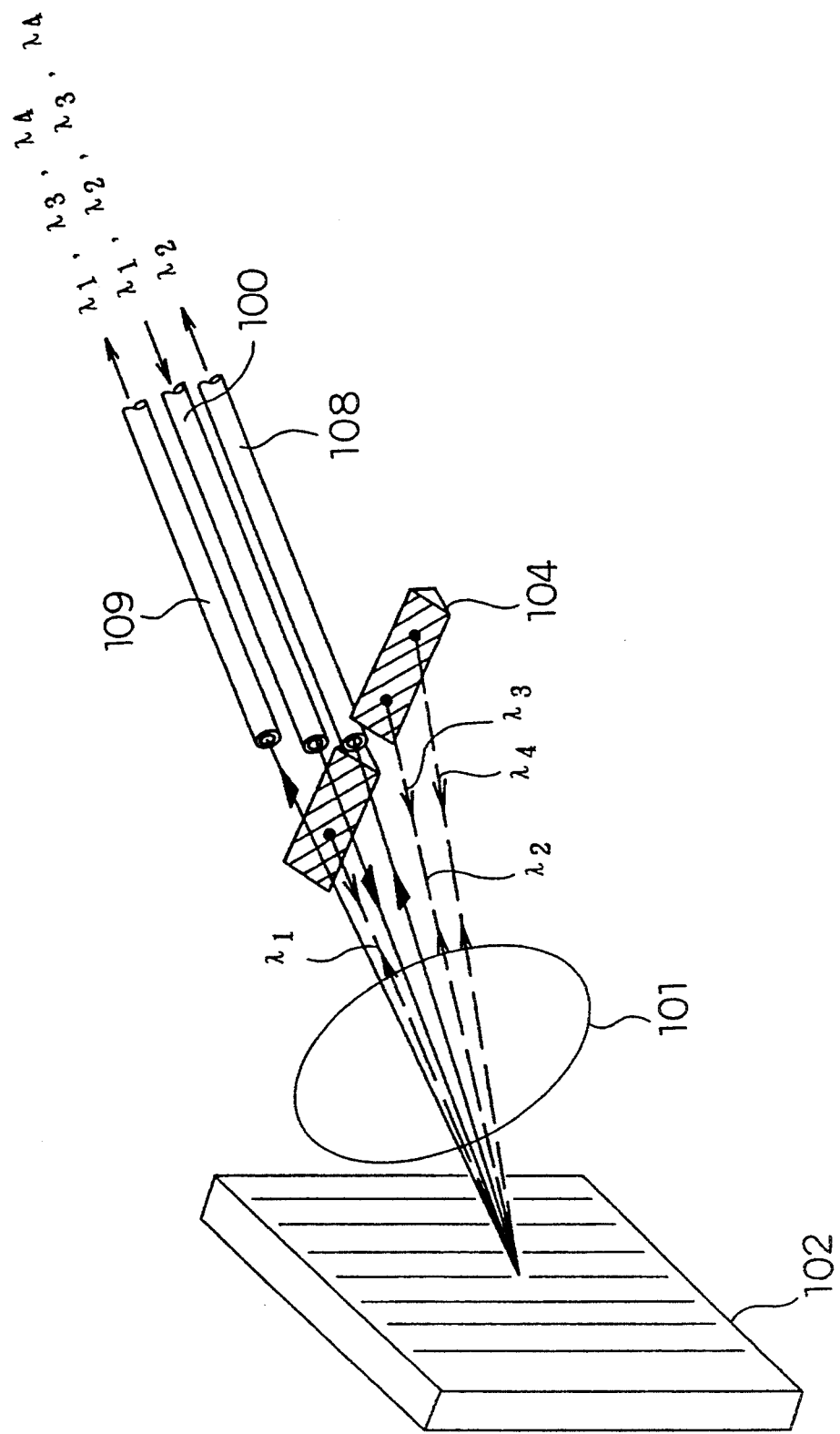
FIG. 9 is a perspective view of a yet further optical tap according to the invention.

FIG. 9 shows the structure of a further optical tap according to the invention. This tap comprises an input fiber 100, a lens 101, a plane diffraction grating 102, output fibers 108, 109, and a reflecting mirror 104. Light signals which are wavelength division-multiplexed with wavelengths $\lambda_1$, $\lambda_2$, $\lambda_3$, and $\lambda_4$ are entered from the input fiber 100 and collimated by the lens 101. Then, the signals are made to fall on the diffraction grating 102. The incident light rays are dispersed through a different angle for each different wavelength by the diffraction grating 102. The dispersed light is made to fall on the lens 101 again, so that the dispersed light is focused at the focal plane of the lens 101. The dispersed light focused at the end surface of the output fiber 108 enters this output fiber 108 and is taken from this fiber. The reflecting mirror 104 is disposed in the focal plane of the lens 101 and reflects the dispersed light. If the core of the output fiber 108 is so located that light of wavelength $\lambda_2$ is focused at the position of the core, the wavelength pass band for the light going from the input fiber 100 to the output fiber 108 exhibits a characteristic as shown by the curve labelled "a" in FIG. 2. The pass band width is determined by the groove spacing in the diffraction grating 102, the focal distance of the lens, and the diameter of the core of the output fiber 108. The wavelength of the transmitted wavelength is determined by the position of the core of the output fiber 108.

The wavelengths $\lambda_1$, $\lambda_3$, and $\lambda_4$ of light which are reflected by the reflecting mirror 104 are coupled into the output fiber 109 by the lens 101 and the diffraction grating 102. Accordingly, the output fiber 109 shows a wavelength pass band characteristic as shown by the curve labelled "b" in FIG. 2. Therefore, if light signals which are wavelength division-multiplexed with the wavelengths $\lambda_1$, $\lambda_2$, $\lambda_3$, and $\lambda_4$ are entered from the input fiber 100, then light signal of the wavelength $\lambda_2$, as shown by the lines labelled "a" in FIG. 3, is taken from the output fiber 108. The light signals of wavelengths $\lambda_1$, $\lambda_3$, and $\lambda_4$, as shown by the lines labelled "b" in FIG. 3, are taken from the output fiber 109.

Figure 10:
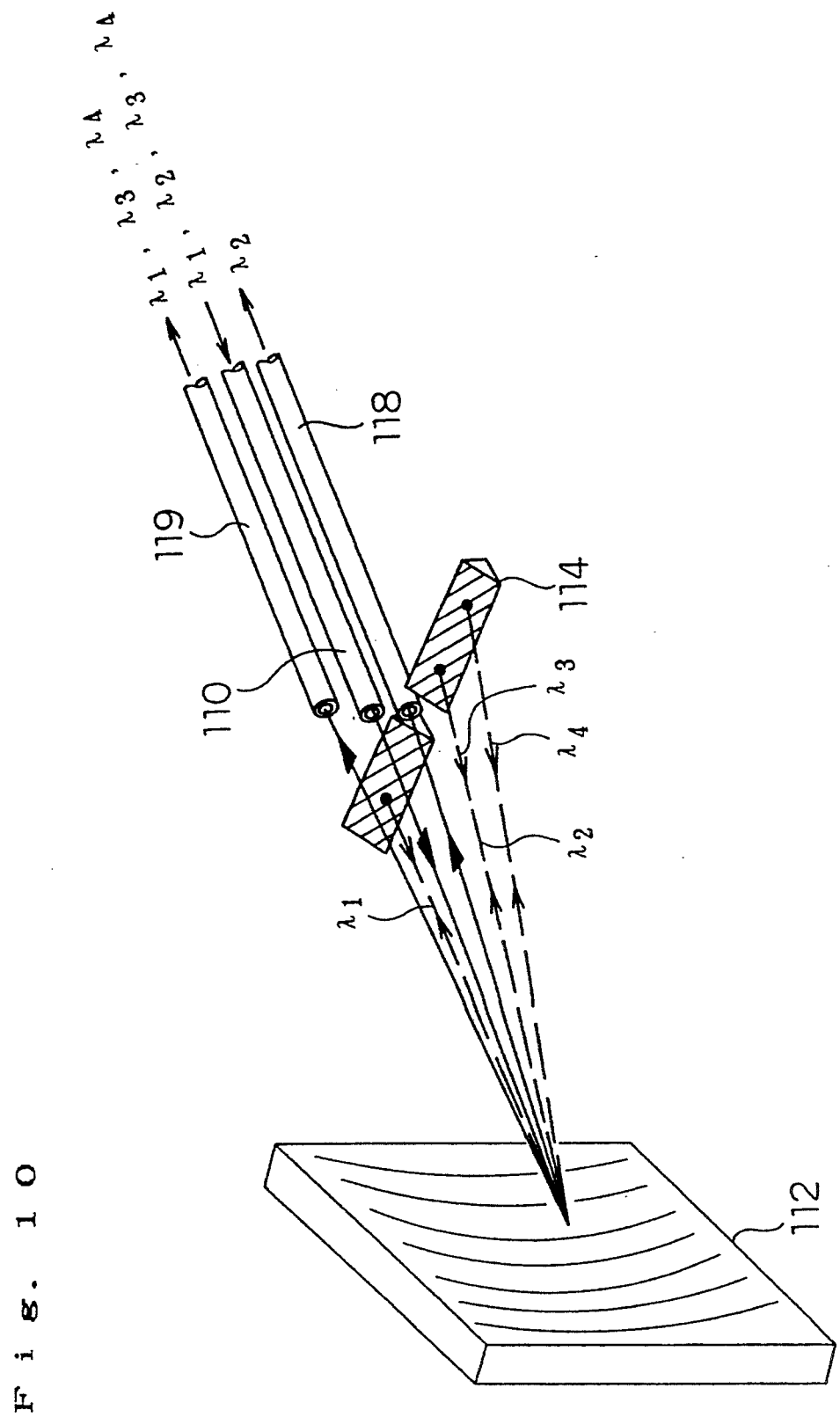
FIG. 10 is a perspective view of a still further optical tap according to the invention.
Figure 11:
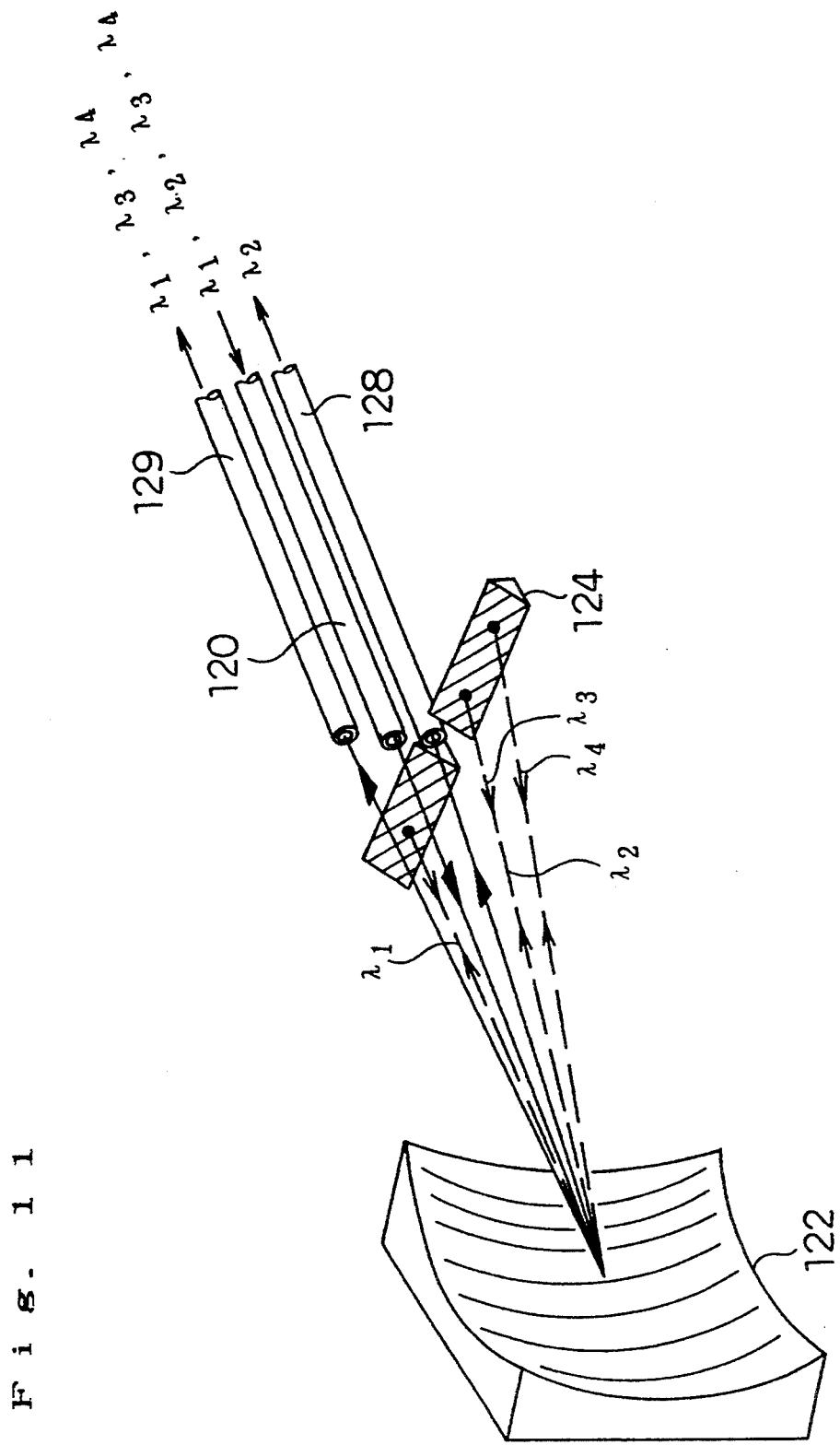
FIG. 11 is a perspective view of a yet additional optical tap according to the invention.

In the present example, the output fibers 108, 109 and the reflecting mirror 104 can be made integral by a holding block. The whole optical system can be integrated into a block by using a refractive index-dispersed lens (GRIN rod lens) having flat end surfaces as the lens 101 and sticking a prism having a desired angle on the diffraction grating 102. The lens 101 can be omitted by using a curvilinear-corrgated diffraction grating or concave diffraction grating instead of the plane diffraction grating 102. FIG. 10 shows an example in which a curvilinear-corrgated diffraction grating 112 is used. FIG. 11 shows an example in which a concave diffraction grating 122 is used. In these examples, no lenses are used and so the number of components is fewer than heretofore. Also, the whole instrument can be made small in size. Light of a desired wavelength can be tapped from the output fibers 108, 118, and 128 by rotating the diffraction gratings 102, 112, and 122 or moving them in the direction of dispersion by a stepper motor, a piezoelectric device, or other driving device.

Figure 12:
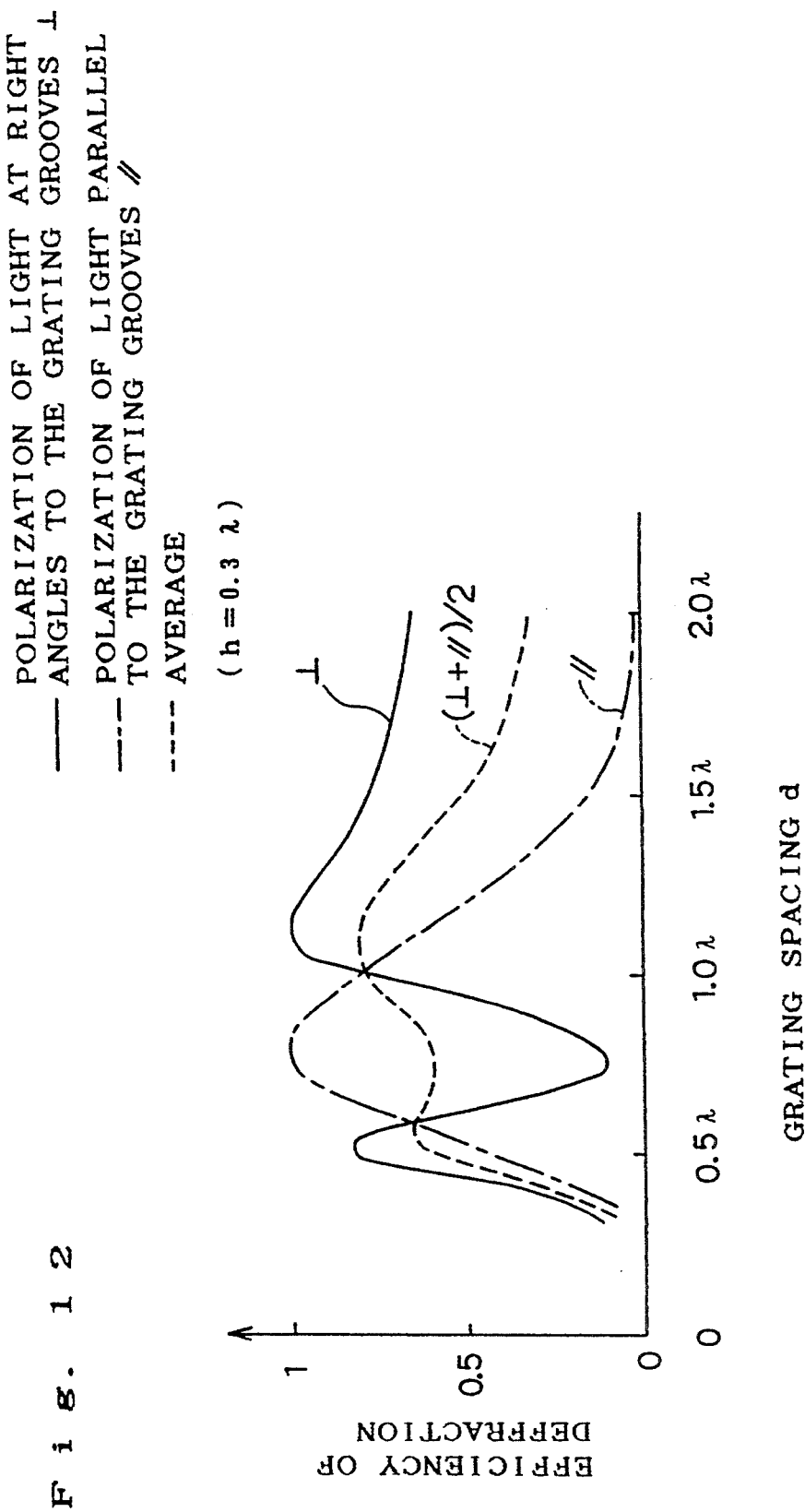
FIG. 12 is a graph showing the relation of the efficiency of a Fourier diffraction grating to the groove spacing.
Figure 13:
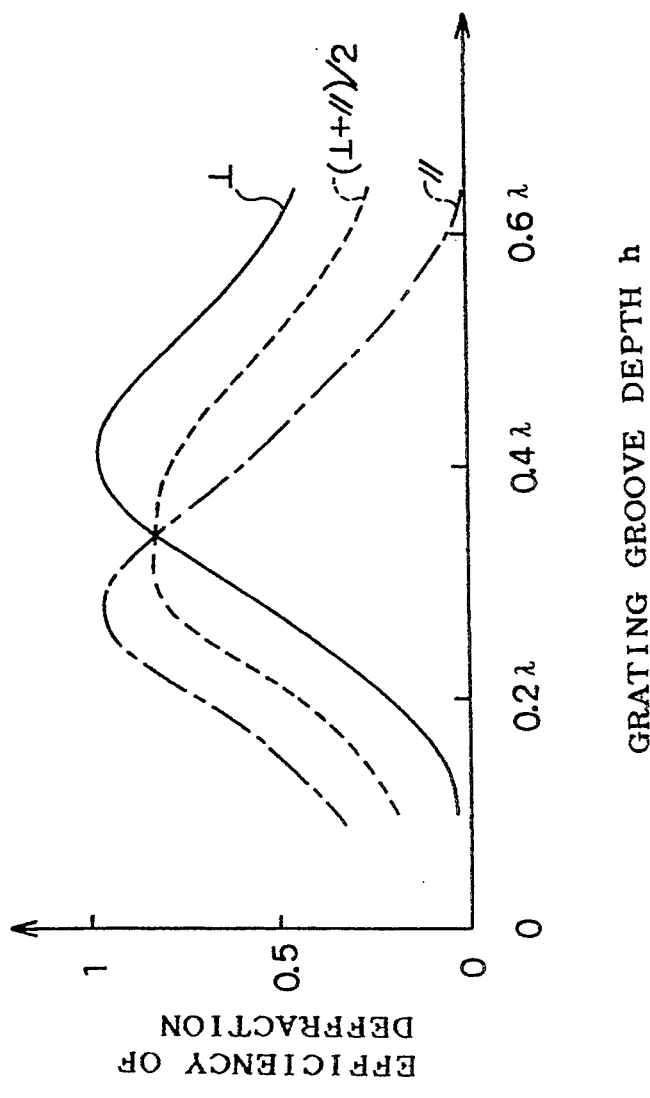
FIG. 13 is a graph showing the relation of the efficiency of a Fourier diffraction grating to the groove depth.

In each of the above embodiments, it is desired to use a Fourier diffraction grating satisfying the conditions $$0.5\lambda < d < 1.5\lambda \text{ and } 0.2d < h < 0.5d$$

where $\lambda$ is the used wavelength, d is the spacing between the grooves in the diffraction grating, and h is the depth of the grooves. A Fourier diffraction grating is a diffraction grating whose cross section is a smooth shape expressed by superimposition of the fundamental sinusoidal wave and its finite harmonics. FIG. 12 shows the relation of the diffraction efficiency for the diffracted light of the first order to the groove spacing of a Fourier diffraction grating. FIG. 13 shows the relation of the diffraction efficiency for the diffracted light of the first order to the groove depth of a Fourier diffraction grating. In these figures, solid lines indicate cases where incident light is polarized at right angles to the grooves of the grating. Dot-and-dash lines indicate cases where incident light is polarized parallel to the grating grooves. Broken lines indicate the average of these two values. Where the grating spacing d is less than 1.5 $\lambda$, diffracted light of the second or higher orders is not generated and so the diffraction efficiency for diffracted light of the first order is high. Where the grating spacing d is less than 0.5 $\lambda$, the efficiency of diffraction is halved. Where the grating groove depth h is greater than 0.5d, the efficiency of diffraction is halved. Where the grating groove h is smaller than 0.2d, the efficiency of diffraction is halved. The Fourier diffraction grating satisfying the above requirements depends only a little on the polarization of incident light and has a high diffraction efficiency. Therefore, the loss is small. Also, noise depending on the polarization of the incident light is small. In this way, good characteristics are obtained.

In any of the embodiments of the invention, the amount of reflection can be reduced by obliquely cutting or polishing the end surfaces of the input and output fibers or by forming an anti-reflection coating. Also, noise produced in the optical tap can be reduced. Furthermore, the end surfaces of the fibers may be obliquely machined and an anti-reflection coating may be formed on the machined surface.

Figure 14:
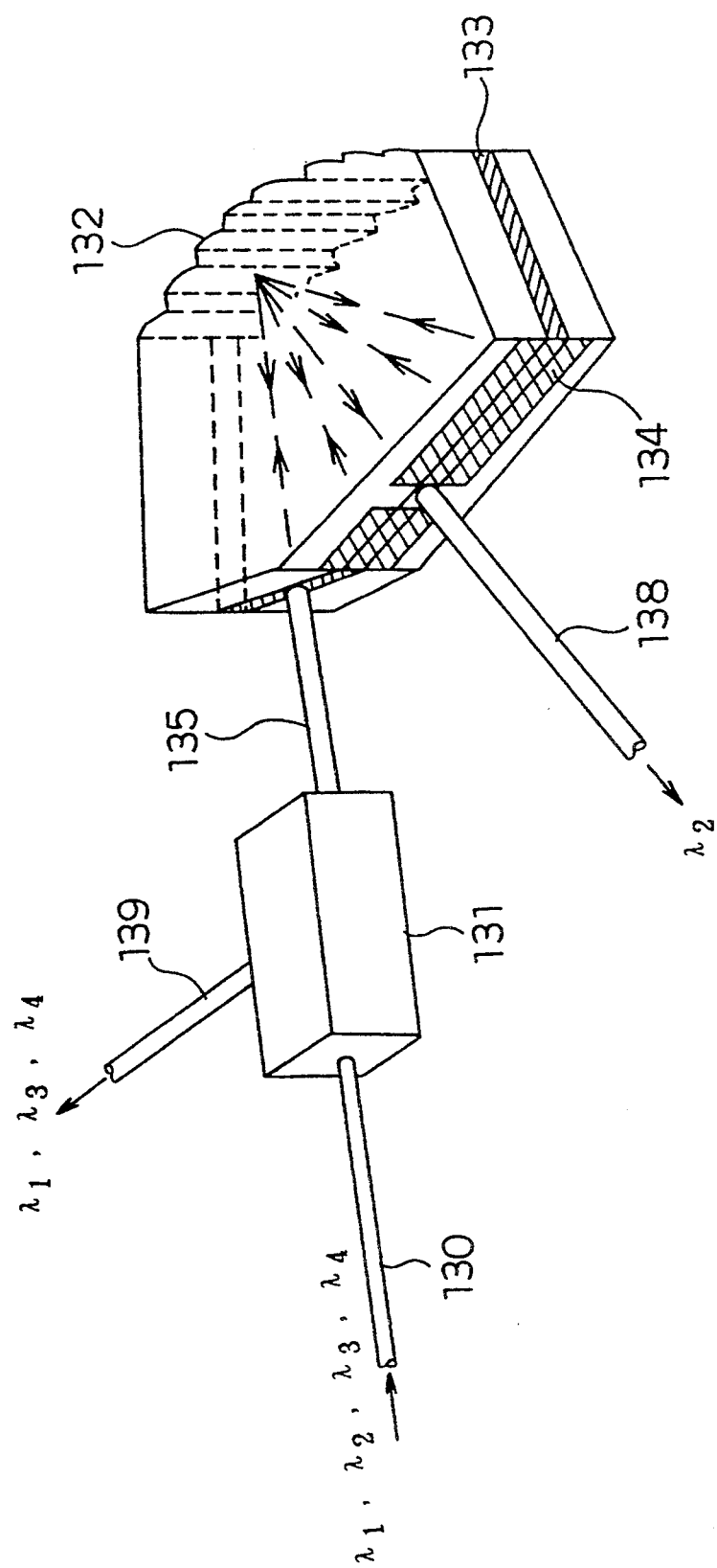
FIG. 14 is a perspective view of a still additional optical tap according to the invention.

A still other embodiment of the invention is shown in FIG. 14. In the present embodiment, a concave diffraction grating 132 is formed at one end surface of a light waveguide 133 to form a monolithic optical system. A directional coupler 131 directs light entered from an input fiber 130 into a fiber 135. Light entered from the fiber 135 is taken from an output fiber 139. Wavelength division-multiplexed light entered into the light waveguide layer 133 from the fiber 135 propagates through the waveguide layer 133, is dispersed by the concave diffraction grating 132, and is focused onto the end surface where an output fiber 138 exists. The output fiber 138 is disposed at a position corresponding to wavelength $\lambda_2$ to be tapped. Waveguide end surfaces 134 on both sides of the output fiber 138 are reflecting surfaces. Light having wavelengths other than the wavelength $\lambda_2$ is reflected by these surfaces and coupled back to the fiber 135 via the concave diffraction grating 132. Then, the light is sent to the output fiber 139 via the directional coupler 131.

What is claimed is:
1. An optical tap comprising:
    an input fiber for receiving light which is wavelength division-multiplexed;
    a diffraction grating for dispersing the light and separating the light into light of wavelengths lying in a certain range and light of wavelengths lying outside said range;
    a reflecting mirror for reflecting light; and a first output fiber into which the light of the wavelengths lying in said certain range is coupled and a second output fiber into which the light of the wavelengths lying outside said range is coupled, by using said reflecting mirror.

2. An optical tap comprising:

an input fiber for receiving light which is wavelength division-multiplexed;

a first plane diffraction grating for dispersing the light entered from said input fiber through a first lens;

a second lens for causing a part of the light dispersed by said first plane diffraction grating to impinge on a reflecting mirror which reflects light of wavelengths lying in a certain range;

a first output fiber into which the light reflected by said reflecting mirror is coupled;

a third lens through which another part of the light dispersed by said first plane diffraction grating is passed;

a second plane diffraction grating for gathering the light passed through said third lens; and a second output fiber into which light reflected by said second diffraction grating is coupled through a fourth lens.

3. An optical tap comprising:

an input fiber for receiving light which is wavelength division-multiplexed;

a first curvilinear-corrgated diffraction grating for dispersing the light entered from said input fiber;

a reflecting mirror for reflecting a part of the light dispersed by said first curvilinear-corrgated diffraction grating, said part of the light being of wavelengths lying in a certain range;

a first output fiber into which the light reflected by said reflecting mirror is coupled;

a second curvilinear-corrgated diffraction grating for gathering another part of the light dispersed by said first curvilinear-corrgated diffraction grating, said another part of the light being of wavelengths lying outside said certain range; and a second output fiber into which light reflected by said second curvilinear-corrgated diffraction grating is coupled.

4. An optical tap comprising:

an input fiber for receiving light which is wavelength division-multiplexed;

a first concave diffraction grating for dispersing the light entered from said input fiber;

a reflecting mirror for reflecting a part of the light dispersed by said first concave diffraction grating, said part of the light being of wavelengths lying in a certain range;

a first output fiber into which the light reflected by said reflecting mirror is coupled;

a second concave diffraction grating for gathering another part of the light dispersed by said first concave diffraction grating, said another part of the light being of wavelengths lying outside said certain range; and a second output fiber into which light reflected by said second diffraction grating is coupled.

5. An optical tap comprising:

an input fiber for receiving light which is wavelength division-multiplexed;

a plane diffraction grating for dispersing the light entered from said input fiber through a first lens;

a second lens through which a part of the light dispersed by said plane diffraction grating is coupled into a first output fiber, said part of the light being of wavelengths lying in a certain range; and a reflecting mirror for reflecting another part of the light dispersed by said plane diffraction grating, to make the another part coupled into a second output fiber, said another part of the light being of wavelengths lying outside said certain range wavelength range.

6. An optical tap comprising:

an input fiber for receiving light which is wavelength division-multiplexed;

a curvilinear-corrgated diffraction grating for dispersing the light entered from said input fiber;

a first output fiber into which a part of the light dispersed by said curvilinear-corrgated diffraction grating is coupled, said part of the light lying in a certain wavelength range;

a reflecting mirror for reflecting another part of the light dispersed by said curvilinear-corrgated diffraction grating to make the another part coupled into a second output fiber, said another part of the light being lying outside said certain wavelength range.

7. An optical tap comprising:

an input fiber for receiving light which is wavelength division-multiplexed;

a concave diffraction grating for dispersing the light entered from said input fiber;

a first output fiber into which a part of the light dispersed by said concave diffraction grating is coupled, said part of the light lying in a certain wavelength range a reflecting mirror for reflecting another part of the light dispersed by said concave diffraction grating to make the another part coupled into a second output fiber, said another part of the light being lying outside said certain wavelength range.

8. An optical tap comprising:

an input fiber for receiving light which is wavelength division-multiplexed;

a lens through which the light from the input fiber is directed to a plane diffraction grating, said lens having a focal plane in which said input fiber is positioned;

said plane diffraction grating for dispersing the light from said lens;

said first output fiber into which a part of the light dispersed by said plane diffraction grating is coupled through said lens, said part of the light lying in a certain wavelength range; and a reflecting mirror for reflecting another part of the light dispersed by said plane diffraction grating, to make the another part of the light coupled into the second output fiber, said wavelengths of said another part lying outside said certain wavelength range.

9. An optical tap comprising:

an input fiber for receiving light which is wavelength division-multiplexed;

a curvilinear-corrgated diffraction grating for dispersing the light, said diffraction grating having a focal plane in which said input fiber is positioned;

a first output fiber into which a part of the light dispersed by said curvilinear-corrgated diffraction grating is coupled, said part of the light certain lying in a certain wavelength range; and a reflecting mirror for reflecting another part of the light dispersed by said curvilinear-corrgated diffraction grating, to make the another part of the light coupled into a second output fiber, said wavelengths of the another part lying outside said certain wavelength range.

10. An optical tap comprising:

an input fiber for receiving light which is wavelength division-multiplexed;

a concave diffraction grating for dispersing the light, said diffraction grating having a focal plane in which said input fiber is positioned;

a first output fiber into which a part of the light dispersed by said concave diffraction grating is coupled, said part of the light certain lying in a certain wavelength range; and a reflecting mirror for reflecting another part of the light dispersed by said concave diffraction grating, to make the another part of the light coupled into a second output fiber, said wavelengths of the another part lying outside said certain wavelength range.

11. The optical tap of claim 1, wherein each of said diffraction gratings having a Fourier diffraction grating having a grating spacing d and a grating groove depth h, said Fourier diffraction grating satisfying relations given by $0.5 < \lambda/d < 1.5$ and $0.2 < h/d < 0.5$ where $\lambda$ is a used wavelength.

12. The optical tap of claim 1, further comprising a driving device for moving, rotating, or tilting said reflecting mirror or said diffraction grating, whereby a selected wavelength can be varied.

13. The optical tap of claim 1, wherein a core-enlarged fiber is used as each of said output fibers.

14. The optical tap of claim 2, wherein said input and output fibers have end surfaces obliquely polished or cut.

15. The optical tap of claim 2, wherein said input and output fibers have end surfaces on which an anti-reflection coating is formed.

16. The optical tap of claim 2, and wherein an aberration-corrected aspherical lens is used as said lens.

17. The optical tap of claim 2, wherein a refractive index-distributed rod lens is used as each of said lenses.

18. An optical tap comprising:

an input fiber for receiving light which is wavelength division-multiplexed;

a directional coupler for directing the light from the input fiber to a light waveguide;

a concave diffraction grating disposed at an end surface of said light waveguide and having a focal plane, the diffraction grating acting to disperse the light supplied through said light waveguide;

a first output fiber into which a part of the light dispersed by the concave diffraction grating is coupled, said part of the light lying in a certain wavelength range;

a reflecting mirror for reflecting another part of the light dispersed by the concave diffraction grating to make the another part of the light coupled into a second output fiber, said another part of the light lying outside said certain wavelength range; and at least said first output fiber and said reflecting mirror being located at said focal plane of said concave diffraction grating.

* * * * *